United States Patent
Wu et al.

(10) Patent No.: US 9,894,660 B2
(45) Date of Patent: Feb. 13, 2018

(54) SCHEDULING METHOD AND SCHEDULING APPARATUS FOR USER EQUIPMENT IN COMMUNICATIONS SYSTEM

(71) Applicant: Huawei Technologies Co., Ltd., Shenzhen (CN)

(72) Inventors: Ye Wu, Shenzhen (CN); Wei Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 14/802,455

(22) Filed: Jul. 17, 2015

(65) Prior Publication Data

US 2015/0327242 A1    Nov. 12, 2015

Related U.S. Application Data

(63) Continuation of application No. PCT/CN2014/070220, filed on Jan. 7, 2014.

(30) Foreign Application Priority Data

Jan. 18, 2013 (CN) .......................... 2013 1 0019183

(51) Int. Cl.
*H04J 3/00* (2006.01)
*H04W 72/04* (2009.01)
(Continued)

(52) U.S. Cl.
CPC ......... *H04W 72/048* (2013.01); *H04L 5/0023* (2013.01); *H04W 72/1231* (2013.01); *H04W 72/121* (2013.01)

(58) Field of Classification Search
CPC ... H04W 72/04; H04W 24/00; H04W 72/048; H04W 72/121; H04L 5/0023
(Continued)

(56) References Cited

U.S. PATENT DOCUMENTS

2003/0181163 A1    9/2003    Ofuji et al.
2007/0149208 A1*   6/2007    Syrbe ................... G01S 5/0205
                                                      455/456.1
(Continued)

FOREIGN PATENT DOCUMENTS

CN         1437420 A       8/2003
CN       101686485 A       3/2010
(Continued)

*Primary Examiner* — Chi H Pham
*Assistant Examiner* — Alexander O Boakye
(74) *Attorney, Agent, or Firm* — Brinks Gilson & Lione

(57) ABSTRACT

Provided are a method and apparatus for scheduling user equipments in a communication system. The method comprises: obtaining geographic position information of UEs in connected state, and determining, in each TTI, the UEs which need to feed back the geographic position information, by a serving base station; obtaining, in the (k+1)-th TTI, the channel information of a first part of UEs among the UEs in the connected state, wherein it is determined in the k-th TTI, based on the channel information of a second part of UEs obtained in the k-th TTI and the geographic position information of the second part of UEs, that the channel information of the first part of UEs is to be obtained in the (k+1)-th TTI; and selecting a UE to be scheduled from the first part of UEs based on the channel information of the first part of UEs.

16 Claims, 8 Drawing Sheets

(51) Int. Cl.
*H04L 5/00* (2006.01)
*H04W 72/12* (2009.01)
(58) Field of Classification Search
USPC .......................................................... 370/336
See application file for complete search history.

(56) References Cited

U.S. PATENT DOCUMENTS

| 2009/0199490 | A1 | 8/2009 | Hockham |
| 2009/0296595 | A1 | 12/2009 | Khoshnevis et al. |
| 2010/0189065 | A1 | 7/2010 | Bahk et al. |
| 2012/0113953 | A1 | 5/2012 | Papadopoulos et al. |
| 2012/0147773 | A1* | 6/2012 | Kim ................... H04L 1/0025 370/252 |
| 2012/0170679 | A1 | 7/2012 | Koo et al. |

FOREIGN PATENT DOCUMENTS

| CN | 102340883 A | 2/2012 |
| EP | 1 335 618 A2 | 8/2003 |
| EP | 1 641 188 A1 | 3/2006 |

* cited by examiner

SCHEDULING METHOD AND SCHEDULING APPARATUS FOR USER EQUIPMENT IN COMMUNICATIONS SYSTEM

CROSS-REFERENCE TO RELATED APPLICATIONS

This application is a continuation of International Application No. PCT/CN2014/070220, filed on Jan. 7, 2014, which claims priority to Chinese Patent Application No. 201310019183.7, filed on Jan. 18, 2013, both of which are hereby incorporated by reference in their entireties.

FIELD OF THE TECHNOLOGY

The present application relates to the field of communication, and particularly to a method and apparatus for scheduling user equipments in a communication system.

BACKGROUND

In conventional multiple-input and multiple-output (MU-MIMO) pairing scheduling technology (i.e., first conventional technology), which relies on only downlink channel information between base station and user equipments (UEs), the base station performs, based on the channel information, greedy scheduling and pairing on the UEs in connected state to achieve the best pairing effect (i.e., obtaining the best channel capacity).

In the first conventional technology, the base station needs to obtain the downlink channel information of each of the UEs in the connected state by: using the UE feedback in frequency division duplexing (FDD)/time division duplexing (TDD) system (regular feedback or irregular feedback, where a typical channel feedback content includes: channel quality indicator (CQI) for downlink precoding, precoding matrix indicator (PMI), and rank indicator (RI)); or performing partial uplink channel measurement by using the channel reciprocity in the TDD system (typically, the uplink channel is measured by using the reciprocity between the uplink and the downlink channels and the obtained information of the downlink channel includes the MIMO channel matrix). In the latter way, the base station may perform the downlink channel precoding without the PMI/RI feedback.

The first conventional technology is applicable to the case of less users in the connected state and less users participating in the MU-MIMO (such as the long term evolution (LTE) system/LTE-advanced system), in which the complexity of the pairing scheduling is controllable and has little influence on the scheduling delay. However, if the first conventional technology is applied to the scene in which the number of the users in the connected state is more and the number of the users participating in the MU-MIMO is more (for example, if the conventional first conventional technology is applied to a large-scale antenna array system), the number of the users in the connected state and the number of the users participating in the MU-MIMO increase tremendously as compared with the LTE/LTE-A system, and the complexity of the pairing scheduling is increased significantly; accordingly, the scheduling delay becomes too long, the influence on the validity of the channel information is significant, and the actual throughput is affected.

The PF scheduling technology (i.e., second conventional technology) is a layer scheduling method widely used in cellular communication system, which takes both the UE channel quality and the historical throughput into account, and ensures the scheduling equity among the UEs while ensuring the system throughput. The PF scheduling method includes steps as follows.

The PF scheduling starts in the current transmission time interval (TTI); each UE in the connected state feeds back the CQI in a manner (such as periodic feedback or non-periodic feedback) agreed in advance between the UE and the base station; the base station calculates the possible maximum rate of each UE in the connected state in this scheduling based on the received CQI fed back by the UE in the connected state most recently; the actual average of the rates in the historical TTIs is filtered in a certain time window to obtain the filtered average rate; based on the ratio of the possible maximum rate in the current TTI to the filtered average rate, the scheduling priorities of all the UEs to be scheduled are calculated; and the PF scheduling in the current TTI is finished.

The second conventional technology may be considered as a branch for the UE scheduling scheme in the first conventional technology, and is applicable to a common UE schedule method. However, when too much UEs are scheduled using the second conventional technology, the channel information of all the UEs need to be obtained; and when the second conventional technology is applied to the large-scale antenna array system, the number of the users in the connected state and the number of the users participating in the MU-MIMO increase tremendously as compared with the LTE/LTE-A system, the complexity of the pairing scheduling is increased significantly; accordingly, the scheduling delay becomes too long, the influence on the validity of the channel information is significant, and the actual throughput is affected.

SUMMARY

The embodiments of the disclosure is to provide a scheduling method and an apparatus for scheduling user equipments in a communication system, to solve the problem in the conventional method for scheduling user equipments that the complexity is high and the scheduling delay is long, thereby improving the validity of the channel information and accuracy of the actual throughput.

To solve the above technical problem, in a first aspect, it is provided a method for scheduling user equipments in a communication system, which includes:

obtaining, by a serving base station, geographic position information of the user equipments, UEs, in connected state, and determining, in each transmission time interval, TTI, the UEs which need to feed back the geographic position information for geographic position update;

obtaining, in the (k+1)-th TTI, the channel information of a first part of UEs among the UEs in the connected state, wherein it is determined in the k-th TTI, based on the channel information of a second part of UEs obtained in the k-th TTI and the geographic position information of the second part of UEs, that the channel information of the first part of UEs is to be obtained in the (k+1)-th TTI, where k is a positive integer; and selecting a UE to be scheduled from the first part of UEs based on the channel information of the first part of UEs. For example, the UE to be MU-MIMO matched and scheduled is selected.

As a first possible implementation in the first aspect, before the process of obtaining geographic position information of the UEs in connected state by the serving base station, the method may further include:

setting geographic cells to which respective base stations belong;

dividing each geographic cell into a plurality of geographic user clusters, and determining a corresponding base station for each geographic user cluster based on a position where the geographic user cluster locates in the geographic cell, wherein each geographic user cluster represents a fixed geographic region in the geographic cell; and determining a plurality of geographic user sets based on the plurality of geographic user clusters, wherein the geographic user set is a set including any number of geographic clusters among the plurality of geographic user clusters.

In conjunction with the first possible implementation in the first aspect, it is further provided a second possible implementation in the first aspect. The serving base station may be provided with timers corresponding to the UEs, the timers may be set to be in a first state at every interval, so that the serving base station may obtain the geographic position information of the UEs corresponding to the timers in the first state, and the interval may be longer than one TTI (the interval may be fixed, or may be agreed between the base station and the UE using a high level signaling or a physical layer signaling); and the process of determining, in each TTI, the UEs which need to feed back the geographic position information for geographic position update may include: in the k-th TTI and the (k+1)-th TTI, notifying (for example, using a radio resource control (Radio Resource Control, RRC) signaling), by the serving base station, the UEs corresponding to the timers in the first state to feed back the geographic position information; receiving the geographic position information fed back by the UEs corresponding to the timers in the first state, wherein the geographic position information includes a geographic user cluster index or an invalid identifier, the geographic user cluster index is used to indicate the geographic user cluster to which the UE belongs, facilitating the serving base station to determine the geographic user cluster and the geographic user set to which the UE belongs based on the geographic user cluster index, and the invalid identifier is used to indicate that the corresponding UE is the geographic cell to which the serving base station belongs; and setting the timers corresponding to the UEs that fed back the geographic position information to be in a second state, wherein the serving base station needs not to obtain the geographic position information of the UEs corresponding the timers in the second state.

In conjunction with the first or the second possible implementation in the first aspect, it is further provided a third possible implementation in the first aspect. The process of determining in the k-th TTI, based on the channel information of a second part of UEs obtained in the k-th TTI and the geographic position information of the second part of UEs, that the channel information of the first part of UEs is to be obtained in the (k+1)-th TTI may include:

obtaining, in the k-th TTI, the channel information of the second part of UEs to select the UE to be scheduled from the second part of UEs; sequencing a first queue based on the geographic position information of the second part of UEs and the UE scheduled in the k-th TTI, wherein the first queue is a queue of all the geographic user sets in the geographic cell in which the serving base station is located arranged in a descending order of value of PF factor; and assigning, for each of the UEs in each of the geographic user sets, the TTI for obtaining the channel information of the UE, so as to determine that the channel information of the first part of UEs is to be obtained in the (k+1)-th TTI.

In conjunction with the third possible implementation in the first aspect, it is further provided a fourth possible implementation in the first aspect. The method may further include, after the process of sequencing a first queue and before the process of determining that the channel information of the first part of UEs is to be obtained: selecting the UE to be scheduled from each of the geographic user clusters corresponding to the serving base station in a manner of round-robin scheduling or random scheduling, so that the maximum instantaneous throughput of all geographic user sets in the (k+1)-th TTI is calculated in the (k+1)-th TTI based on the UE to be scheduled, and the PF factors are calculated to determine the sequence in which all the geographic user sets are arranged in the descending order of the value of the PF factor, where the PF factor is calculated by dividing the maximum instantaneous throughput of the geographic user set in the (k+1)-th TTI by an alpha filtered historical throughput within a sliding window.

In conjunction with the fourth possible implementation in the first aspect, it is further provided a fifth possible implementation in the first aspect. The process of sequencing a first queue may include: arranging, at a tail of the first queue, the geographic user set that does not meet a first condition among the geographic user sets to which the second part of UEs belongs based on the geographic position information of the second part of UEs, wherein the first condition is that at least one UE of the second part of UEs is contained and the UE belongs to the same geographic user cluster for a preset interval; arranging, at the tail of the first queue, the geographic user set that is located at a head of the first queue currently; and arranging the UE to be scheduled, which is selected from the second part of UEs, at the end of the geographic user cluster to which the UE belongs.

In conjunction with the fifth possible implementation in the first aspect, it is further provided a sixth possible implementation in the first aspect. The process of assigning, for each of the UEs in each of the geographic user sets, the TTI for obtaining the channel information of the UE may include: in the sequenced first queue, the TTIs assigned for UEs in an anterior geographic user set being earlier than the TTIs assigned for the UEs in a posterior geographic user set; and in each geographic user cluster, the TTIs assigned for anterior UEs being earlier than the TTIs assigned for posterior UEs.

In conjunction with the third possible implementation in the first aspect, it is further provided a seventh possible implementation in the first aspect. The process of obtaining the channel information of the second part of UEs may include obtaining the channel information of each of the UEs in the connected state, if k=1. Further, optionally, the first queue may include all the geographic user sets in the geographic cell in which the serving base station is located arranged in a default order.

In a second aspect, it is provided an apparatus for scheduling user equipments in a communication system, which includes:

a geographic position information processing unit, configured to obtain geographic position information of the user equipments, UEs, in connected state contained in a serving base station, and determine, in each transmission time interval, TTI, the UEs which need to feed back the geographic position information for geographic position update;

a first channel information obtaining unit, configured to obtain, in the (k+1)-th TTI, the channel information of a first part of UEs among the UEs in the connected state;

a second channel information obtaining unit, configured to obtain, in the k-th TTI, the channel information of a second part of UEs;

a UE determining unit, configured to determine in the k-th TTI, based on the channel information of the second part of UEs and the geographic position information of the second part of UEs, that the channel information of the first part of UEs is to be obtained in the (k+1)-th TTI, where k is a positive integer; and a pairing scheduling unit, configured to select a UE to be scheduled from the first part of UEs based on the channel information of the first part of UEs. For example, the UE to be MU-MIMO matched and scheduled is selected.

As a first possible implementation in the second aspect, the apparatus may further include a geographic cell dividing unit configured to: set geographic cells to which respective base stations belong; divide each geographic cell into a plurality of geographic user clusters, and determine a corresponding base station for each geographic user cluster based on a position where the geographic user cluster locates in the geographic cell, wherein each geographic user cluster represents a fixed geographic region in the geographic cell; and determine a plurality of geographic user sets based on the plurality of geographic user clusters, wherein the geographic user set is a set including any number of geographic clusters among the plurality of geographic user clusters.

In conjunction with the first possible implementation in the second aspect, it is further provided a second possible implementation in the second aspect. The geographic position information processing unit may include:

timers corresponding to the UEs, wherein the timer is set to be in a first state at every interval, to indicate that the geographic position information obtaining unit needs to obtain the geographic position information of the UE corresponding to the timer, the timer is set to be in a second state after the geographic position information of the UE corresponding to the timer is obtained by the geographic position information obtaining unit, to indicate that the geographic position information obtaining unit needs not to obtain the geographic position information of the UE corresponding to the timer in the second state, and the interval is longer than one TTI (the value of the interval may be a preset fixed value, or may be agreed between the base station and the UE using a high layer signaling or a physical layer signaling); a sending module, configured to notify (for example, using a radio resource control (Radio Resource Control, RRC) signaling), in the current TTI, the UEs corresponding to the timers in the first state to feed back the geographic position information; and a receiving module, configured to receive the geographic position information fed back by the UEs corresponding to the timers in the first state, wherein the geographic position information includes a geographic user cluster index or an invalid identifier, the geographic user cluster index is used to indicate the geographic user cluster to which the UE belongs, facilitating the serving base station to determine the geographic user cluster and the geographic user set to which the corresponding UE belongs based on the geographic user cluster index, and the invalid identifier is used to indicate that the corresponding UE is the geographic cell to which the serving base station belongs.

In conjunction with the second possible implementation in the second aspect, it is further provided a third possible implementation in the second aspect. The UE determining unit may include:

a scheduling module, configured to select, in the k-th TTI, the UE to be scheduled from the second part of UEs based on the channel information of the second part of UEs; a sequencing module, configured to sequence a first queue based on the geographic position information of the second part of UEs and the UE scheduled in the k-th TTI, wherein the first queue is a queue of all the geographic user sets in the geographic cell in which the serving base station is located arranged in a descending order of value of PF factor; and a TTI assigning module, configured to assign, for each of the UEs in each of the geographic user sets, the TTI for obtaining the channel information of the UE, so as to determine that the channel information of the first part of UEs is to be obtained in the (k+1)-th TTI.

In conjunction with the third possible implementation in the second aspect, it is further provided a fourth possible implementation in the second aspect. The UE determining unit may further include:

a to-be-scheduled UE determining module, configured to select the UE to be scheduled from each of the geographic user clusters corresponding to the serving base station in a manner of round-robin scheduling or random scheduling, to facilitate the apparatus to calculate in the (k+1)-th TTI the maximum instantaneous throughput of all geographic user sets in the (k+1)-th TTI based on the UE to be scheduled, and the PF factors are calculated to determine the queue in which all the geographic user sets are arranged in the descending order of the value of the PF factor, where the PF factor is calculated by dividing the maximum instantaneous throughput of the geographic user set in the (k+1)-th TTI by an alpha filtered historical throughput within a sliding window.

In conjunction with the fourth possible implementation in the second aspect, it is further provided a fifth possible implementation in the second aspect. The sequencing module may include:

a first sequencing sub-module, configured to arrange, at a tail of the first queue, the geographic user set that does not meet a first condition among the geographic user sets to which the second part of UEs belong based on the geographic position information of the second part of UEs, wherein the first condition includes including at least one UE of the second part of UEs and the UE belongs to the same geographic user cluster for a preset period of time; a second sequencing sub-module, configured to arrange, at the tail of the first queue, the geographic user set that is located at a head of the first queue currently; and a third sequencing sub-module, configured to arrange the UE to be scheduled, which is selected from the second part of UEs, at the end of the geographic user cluster to which the UE belongs.

In conjunction with the fifth possible implementation in the second aspect, it is further provided a sixth possible implementation in the second aspect. The TTI assigning module may include:

a first assigning sub-module, configured to assign, for the UEs in the geographic user sets in the sequenced first queue, the TTIs for obtaining the channel information of the UEs in a way that the TTIs assigned for UEs in an anterior geographic user set are earlier than the TTIs assigned for the UEs in a posterior geographic user set; and a second assigning sub-module, configured to assign earlier TTIs for anterior UEs and latter TTIs for posterior UEs.

As a seventh possible implementation in the second aspect, in case of k=1, the second channel information obtaining unit is configured to obtain, in the k-th TTI, the channel information of a second part of UEs among the UEs in the connected state by: obtaining the channel information of each of the UEs in the connected state. Further, optionally, the first queue may include all the geographic user sets in the geographic cell in which the serving base station is located arranged in a default order.

The embodiment of the disclosure has benefit effects as follows. The channel information of the first part of UEs among the UEs in the connected state is obtained in the (k+1)-th TTI, and the UE to be scheduled is selected from the first part of UEs (i.e., in each TTI it is only needed to obtain the channel information of a part of the UEs in the connected state but not the channel information of all the UEs in the connected state), the frequency for obtaining the channel information of the same UE is lowered, the complexity of the pairing scheduling mechanism is reduced, the scheduling delay caused by the complex scheduling mechanism is shortened, and the validity of the channel information and the accuracy of the actual throughput are improved.

BRIEF DESCRIPTION OF THE DRAWINGS

In order to illustrate the technical solutions according to the embodiments of the present disclosure or in the conventional technology more clearly, drawings to be used in the description of the conventional technology or the embodiments will be described briefly hereinafter. Apparently, the drawings described hereinafter are only some embodiments of the present disclosure, and other drawings may be obtained by those skilled in the art according to those drawings without creative labor.

DETAILED DESCRIPTION OF THE EMBODIMENTS

Hereinafter, the technical solution in the embodiment of the present disclosure will be described clearly and completely in conjunction with the drawings in the embodiment of the present disclosure. Obviously, the described embodiments are only some of the embodiments of the present disclosure, but not all the embodiments. All the other embodiments obtained by those skilled in the art based on the embodiment in the present disclosure without creative labor will fall within the scope of protection of the present disclosure.

Figure 1:
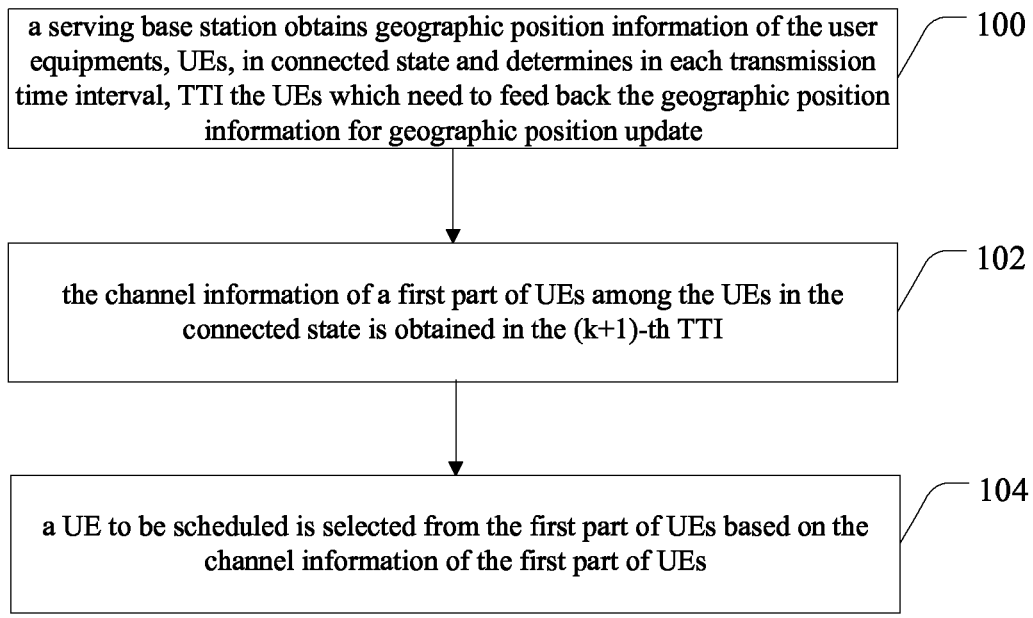
FIG. 1 is a schematic flowchart of a method for scheduling user equipments in a communication system according to an embodiment of the disclosure.

Referring to FIG. 1, in which a schematic flowchart of a method for scheduling user equipments in a communication system according to an embodiment of the disclosure is shown, the method includes step 102 to step 104 as follows.

In step 100, a serving base station obtains geographic position information of the user equipments, UEs, in connected state and determines in each transmission time interval, TTI the UEs which need to feed back the geographic position information for geographic position update.

Optionally, in one case of step 110, it is determined in one TTI that there is no need to obtain the geographic position information of any UE.

In step 102, the channel information of a first part of UEs among the UEs in the connected state is obtained in the (k+1)-th TTI, where it is determined in the k-th TTI, based on the channel information of a second part of UEs obtained in the k-th TTI and the geographic position information of the second part of UEs, that the channel information of the first part of UEs is to be obtained in the (k+1)-th TTI, where k is a positive integer.

As to be understood by those skilled in the art, a cyclic process is performed in step 102. It is determined in the k-th TTI that the channel information of the first part of UEs is to be obtained in the (k+1)-th TTI, and it is determined in the (k+1)-th TTI UEs for which the channel information is to be obtained in the (k+2)-th TTI, and so on.

In step 104, a UE to be scheduled is selected from the first part of UEs based on the channel information of the first part of UEs. For example, when applied in the MU-MIMO system, the UE on which MI-MIMO scheduling is to be performed may be selected.

For the implementation for step 104, reference may be made to the conventional art, which is not limited herein.

With the method according to this embodiment, the channel information of the first part of UEs among the UEs in the connected state is obtained in the (k+1)-th TTI, and the UE to be scheduled is selected from the first part of UEs; it is not needed to obtain channel information of all the UEs in one TTI, and it is not needed to select the UE on which paring scheduling is to be performed from all the UEs. The amount of the fed-back channel information is reduced, the frequency for obtaining the channel information of the same UE is lowered, the complexity of the pairing scheduling mechanism is reduced, the scheduling delay is shortened effectively, and the validity of the channel information and the accuracy of the actual throughput are ensured.

Figure 2A:
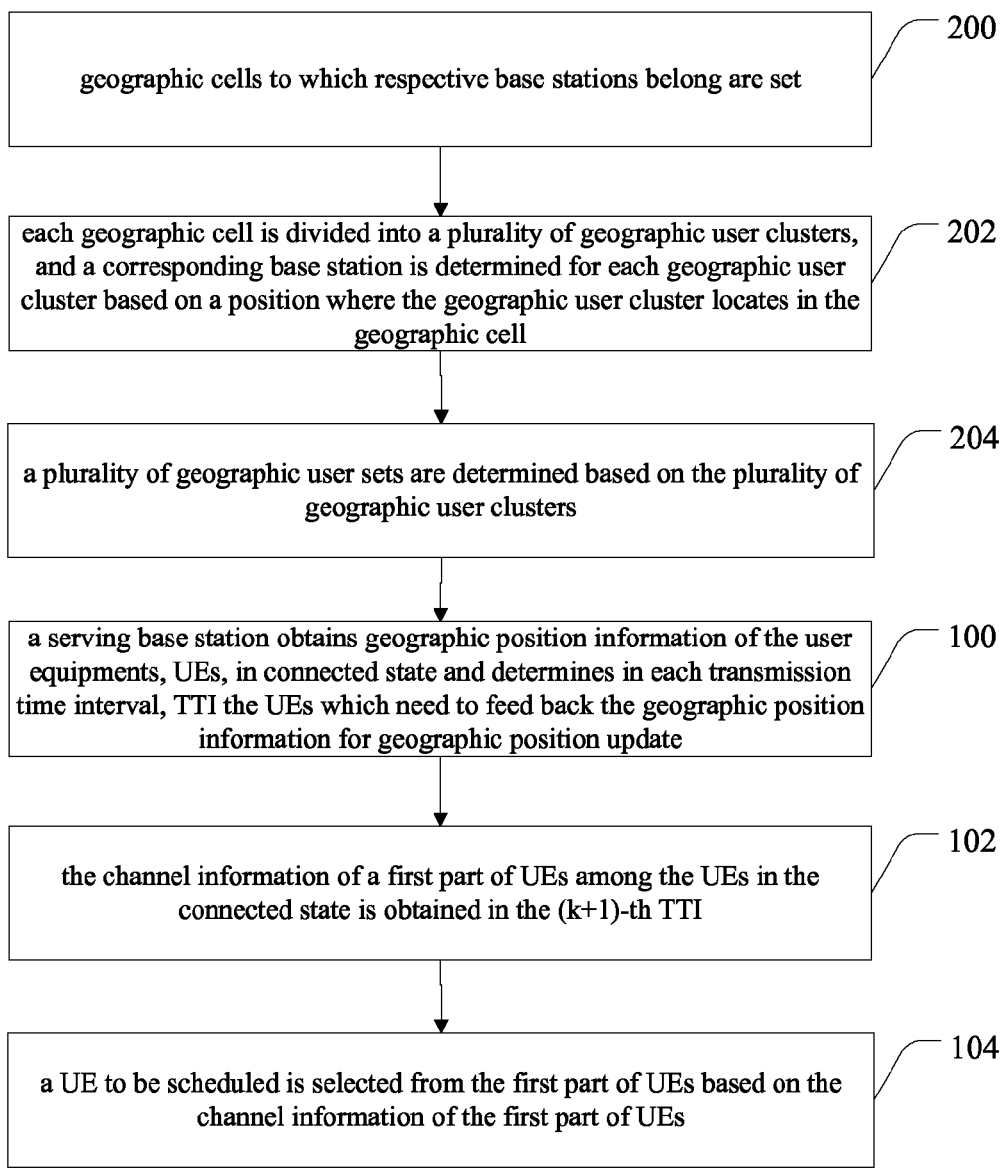
FIG. 2A is a schematic flowchart of a method for scheduling user equipments in a communication system according to an embodiment of the disclosure.

Optionally, in an implementation for the embodiment shown in FIG. 1, referring to FIG. 2A, before step 100, the method further includes step 200 to step 204 as follows.

In step 200, geographic cells to which respective base stations belong are set. The geographic cell is irrelevant to the real-time signal coverage of cell.

In step 202, each geographic cell is divided into a plurality of geographic user clusters ("geographic user clusters" is referred to as "user cluster" for short hereinafter), and a corresponding base station is determined for each geographic user cluster based on a position where the geographic user cluster locates in the geographic cell, where each geographic user cluster represents a fixed geographic region in the geographic cell. Each geographic cell is formed by combining the multiple geographic user clusters seamlessly.

In step 204, a plurality of geographic user sets are determined based on the plurality of geographic user clusters ("geographic user cluster" is referred to as "user set" for short hereinafter), where the geographic user set is a set including any number of geographic clusters among the plurality of geographic user clusters. The correspondence between the geographic user sets and the base stations is determined by the correspondence between the geographic user clusters in the geographic user sets and the base stations.

The division in terms of the geographic cells, the user sets and the user clusters provides a range for selecting the first part of UEs and the second part of UEs. The process of obtaining the channel information of all the UEs in the connected state is simplified to be the process of obtaining the channel information of part of UEs in part of user clusters.

Figure 2B:
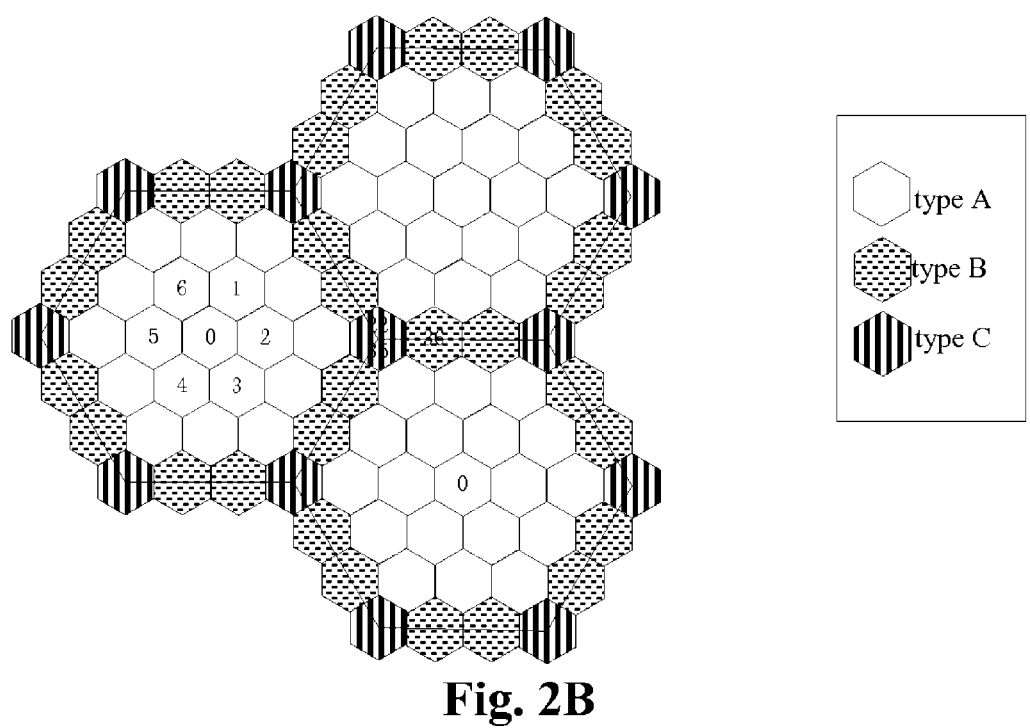
FIG. 2B is a schematic diagram of division of geographic cells according to an embodiment of the disclosure.

As an example, a schematic diagram of division of the geographic cells is shown in FIG. 2B. Referring to FIG. 2B, the hexagon region with the largest area indicates the geographic cell of one base station, and the respective geographic cells are combined seamlessly to cover the geographic region. Each geographic cell is divided into multiple geographic user clusters (such as the smallest hexagon in FIG. 2B), and the respective geographic user clusters are combined seamlessly to cover the geographic cell.

As shown in FIG. 2B, at the edge of the geographic cell, the same geographic user cluster may belong to multiple geographic cells. Based on the division of the geographic user clusters, the correspondence between the geographic user clusters and the transmitting base stations is determined as follows: geographic user clusters of type A belong to one geographic cell, geographic user clusters of type B belong to two geographic cells, and geographic user clusters of type C belong to three geographic cells.

Optionally, each geographic user cluster in the same geographic cell has a unique geographic user cluster index. Since, the geographic user clusters of type B or C correspond to different geographic cells, and thus have different geographic user cluster indexes. The UE in the geographic cell may stores an electronic map for determining the geographic user cluster of the UE using GPS, and may reports the corresponding geographic user cluster index to the base station. Practically, the GPS information of the UE may be reported directly, and the geographic user cluster of the UE is determined by the base station based on the electronic map and the planning of the geographic cells and the user clusters. For example, the digitals in FIG. 2B represent the user cluster indexes of corresponding geographic user clusters.

The user set is a set of user clusters. In the disclosure, the number, kind or position of the user clusters in the user set are not limited. Optionally, the user clusters in one user set may be distributed regularly centered around the base station. For example, the user set 1 includes the user clusters 1, 3 and 5 in FIG. 3B, and the user set 2 includes the user clusters 2, 4 and 6.

The correspondence between the geographic user sets and the transmitting base stations may be determined based on the correspondence between the geographic user clusters and the serving base stations. For example, if a user set in the geographic cell on the left of FIG. 2B includes the user clusters 1, 3 and 22, the user set corresponds to the base station which corresponds to three geographic cells in FIG. 2B.

Optionally, in an implementation of the embodiment shown in FIG. 1, the serving base station is provided with timers corresponding to the UEs, the timer is set to be in a first state at every interval, so that the serving base station obtains the geographic position information of the UEs corresponding to the timers in the first state, and the interval is longer than one TTI. The interval may be fixed, or may be agreed between the base station and the UE using a high level signaling or physical layer signaling. Further, optionally, in step 100, the process of determining, in each TTI, the UEs which need to feed back the geographic position information for geographic position update may include:

in the k-th TTI and the (k+1)-th TTI,

A) notifying (for example, using a RRC signaling), by the serving base station, the UEs corresponding to the timers in the first state to feed back the geographic position information;

B) receiving the geographic position information fed back by the UEs corresponding to the timers in the first state, where the geographic position information includes a geographic user cluster index or an invalid identifier, the geographic user cluster index indicates the geographic user cluster to which the UE belongs, so that facilitating the serving base station to determine the geographic user cluster and the geographic user set to which the corresponding UE belongs based on the geographic user cluster index, and the invalid identifier indicates that the corresponding UE is outside the geographic cell to which the serving base station belongs; and C) setting the timers corresponding to the UEs that fed back the geographic position information to be in a second state, where the serving base station needs not to obtain the geographic position information of the UEs corresponding the timers in the second state.

Optionally, in this implementation, the period and the starting time for the UE to feed back the geographic position information are agreed between the serving base station and the UE using the high level signaling (such as RRC) or the physical layer signaling. Alternatively, the period for all the UEs to feedback to the base station may be fixed, and only the starting time for the UE to feedback the geographic position information is agreed between the serving base station and the UE using the high level signaling or the physical layer signaling. In this way, the timer of the UE may switch between a first state and a second state based on the period, the starting time and the ending time of the feedback.

Optionally, in this implementation, the average time interval for obtaining the geographic position information of the user equipment is longer than tens of TTIs (such as ten TTIs, 30 TTIs or 50 TTIs. A typical TTI is 1 ms, such as the TTI in LTE). For each UE, the feedback of the geographic position information is low feedback, with the feedback interval being in the order of second (such as one second).

Figure 3:
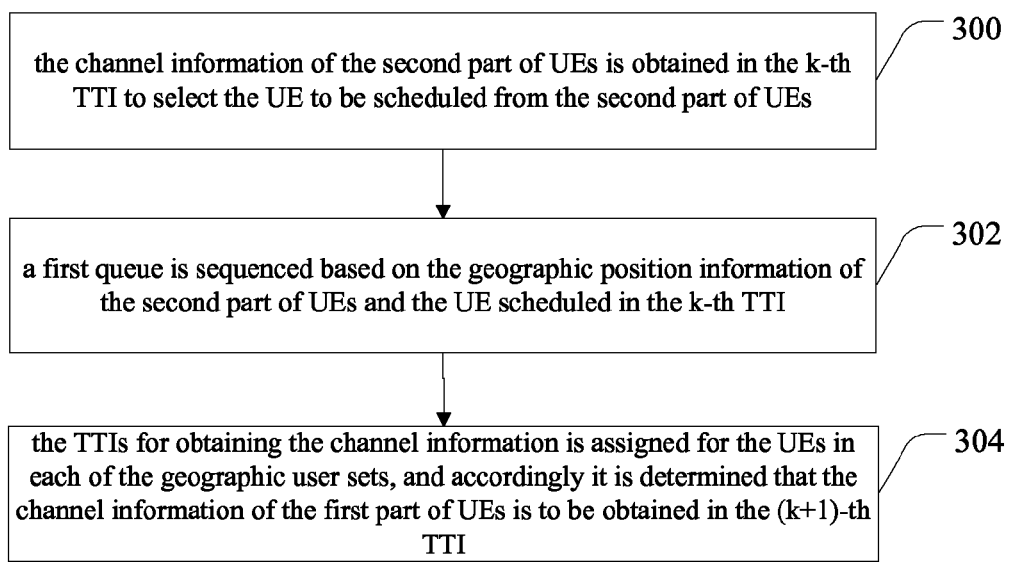
FIG. 3 is a schematic flowchart of a method for determining UEs for which channel information is to be obtained in the (k+1)-th TTI.

Optionally, in an implementation for the embodiment shown in FIG. 1, referring to FIG. 3, step 102 may include step 300 to step 304 as follows.

In step 300, the channel information of the second part of UEs is obtained in the k-th TTI to select the UE to be scheduled from the second part of UEs.

Optionally, if k=1, the second part of UEs may be all the UEs in the connected state, or may be a part of the UEs in the connected state which are selected randomly, which is not limited herein.

In step 302, a first queue is sequenced based on the geographic position information of the second part of UEs and the UE scheduled in the k-th TTI, where the first queue is a queue of all the geographic user sets in the geographic cell in which the serving base station is located, arranged in a descending order of value of PF factor.

Optionally, the process of sequencing a first queue may include step a to step c as follows.

In step a, the geographic user set that does not meet a first condition among the geographic user sets to which the second part of UEs belong is arranged at a tail of the first queue based on the geographic position information of the second part of UEs, where the first condition is that at least one UE of the second part of UEs is contained and the UE belongs to the same geographic user cluster for a preset period of time.

The historical geographic position information (including the geographic position information fed back by the UE most recently or in the current TTI) of the UEs is stored in the serving base station. The historical geographic position of the UE in the geographic cell may be in the following cases: the UE stays in the same geographic user cluster for a preset period of time, or the UE is outside the geographic cell corresponding to the serving cell (for example, the geographic position feedback information includes an invalid identifier), or the geographic user cluster to which the UE belongs is changed within the sliding time window.

Optionally, in step a, in sequencing the first queue, if the user set 3 under sequencing corresponds to multiple geographic cells, for example, corresponds to the geographic cells M and N in addition to the geographic cell L in which the serving base station is located, the synchronization operation is performed, which includes steps as follows.

1) the geographic cells M and N are notified of the channel information of at least one of the first part of UEs in the user set 3, so that the geographic cells M and N adjust or add these UEs into the corresponding geographic user clusters in the geographic user set 3' and the geographic user set 3" respectively, and arrange these UEs in front of the UEs in the corresponding geographic user clusters. 2) The sequence of the geographic user sets 3, 3' and 3" in the corresponding geographic cell are synchronized. For example, if the sequence of the geographic user set 3 among the geographic user sets in geographic cell L is the second, the sequence of the geographic user set 3' among the geographic user sets in the geographic cell M is the fourth, and the sequence of the geographic user set 3" among the geographic user sets in the geographic cell N is the fifth, the geographic user sets 3 and 3' are scheduled to the fifth among the corresponding geographic user sets (i.e., the synchronization is performed based on the sequence in the last).

If the geographic user set correspond to multiple geographic cells, the coverage of the geographic user set is fixed. However, since the geographic user set includes multiple geographic user clusters, the multiple geographic user clusters belong to different geographic cells, and the operations (such as the UE sequencing) performed by different base stations on the user clusters in the same geographic user set are different, the operations for the geographic user sets in respective geographic cells are independent from each other, except the synchronization as mentioned above. The geographic user sets 3, 3' and 3" are named differently, but have the same coverage.

In step b, the geographic user set that is arranged at a head of the first queue currently is arranged at the tail of the first queue.

In step c, the UE to be scheduled, which is selected from the second part of UEs, is arranged at the end of the geographic user cluster to which the UE belongs.

In step 304, the TTIs for obtaining the channel information is assigned for the UEs in each of the geographic user sets, and accordingly it is determined that the channel information of the first part of UEs is to be obtained in the (k+1)-th TTI.

Optionally, the process of assigning, for the UEs in each of the geographic user sets, the TTIs for obtaining the channel information may be as follows:

in the sequenced first queue, the TTIs assigned for UEs in an anterior geographic user set are earlier than the TTIs assigned for the UEs in a posterior geographic user set; and in each geographic user cluster, the TTIs assigned for anterior UEs are earlier than the TTIs assigned for posterior UEs.

With this implementation, the geographic user sets are sequenced, the UEs included by the geographic user clusters in the geographic user set are sequenced, and the TTIs for obtaining the channel information are assigned for the respective geographic user sets and the respective UEs, so that the serving base station only needs to obtain the channel information of part of the UEs in one TTI, but does not need to obtain the channel information of all the UEs in the connected state. The amount of the fed-back channel information is reduced, the frequency for feeding back the channel information is lowered, the scheduling delay is shortened, and the validity of the channel information and the accuracy of the actual throughput are improved.

Figure 4:
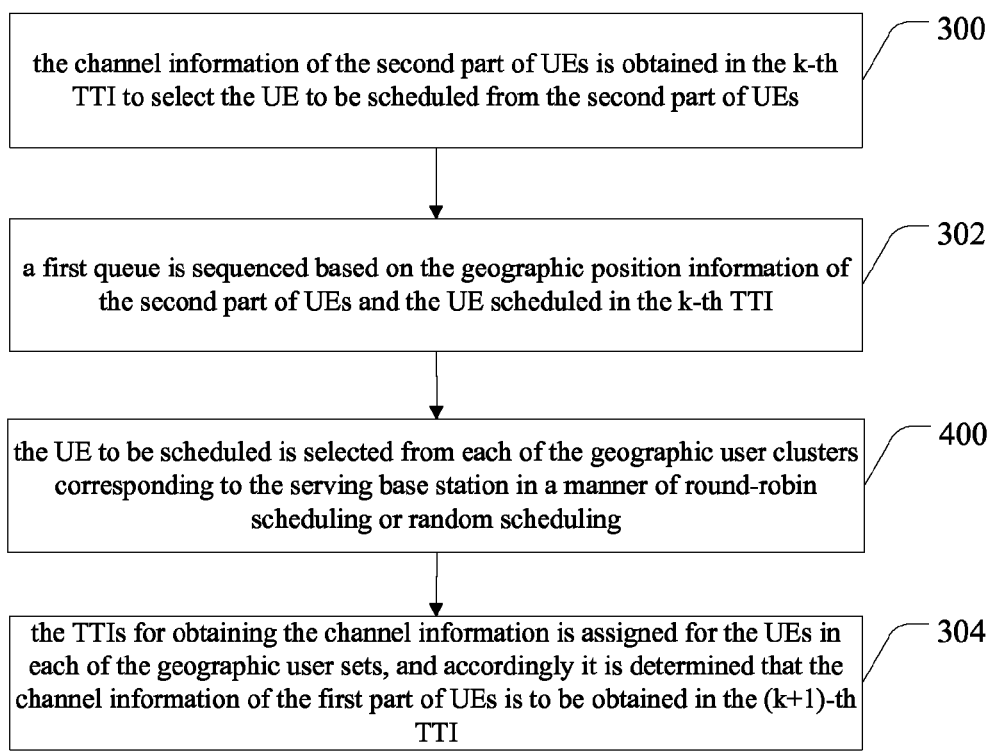
FIG. 4 is a schematic flowchart of a method for determining UEs for which channel information is to be obtained in the (k+1)-th TTI.

In the implementation shown in FIG. 3, optionally, referring to FIG. 4, after step 302 and before step 304, the method may further include step 400 as follows.

In step 400, the UE to be scheduled is selected from each of the geographic user clusters corresponding to the serving base station in a manner of round-robin scheduling or random scheduling. Accordingly, the maximum instantaneous throughput of all geographic user sets in the (k+1)-th TTI is calculated in the (k+1)-th TTI based on the UE to be scheduled, and the PF factors are calculated to determine the sequence in which all the geographic user sets are arranged in the descending order of the PF factor, where the PF factor is calculated by dividing the maximum instantaneous throughput of the corresponding geographic user set in the (k+1)-th TTI by an alpha filtered historical throughput within a sliding window.

Apparently, in the k-th TTI, the UE to be scheduled, which is needed for calculating the PF factors of the respective geographic user sets, may also be determined using the above scheme. In the (k+1)-th TTI, all the geographic user sets may be sequenced using the implementation in step 302.

Optionally, if k=1, all the geographic user sets are sequenced in a default order. Alternatively, at least one UE is selected from one or more geographic user sets randomly as the UE to be scheduled. The case in which k=1 is not limited here.

Figure 5:
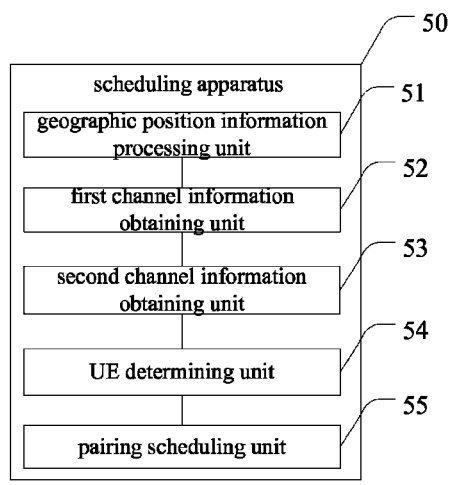
FIG. 5 is a schematic structural diagram of an apparatus for scheduling user equipments in a communication system according to an embodiment of the disclosure.

Referring to FIG. 5, in which an apparatus for scheduling user equipments in a communication system according to an embodiment of the disclosure is shown, the scheduling apparatus 50 includes a geographic position information processing unit 51, a first channel information obtaining unit 52, a second channel information obtaining unit 53, a UE determining unit 54 and a pairing scheduling unit 55.

The geographic position information processing unit 51 is configured to obtain geographic position information of the user equipments, UEs, in connected state contained in a serving base station, and determine, in each transmission time interval, TTI, the UEs which need to feed back the geographic position information for geographic position update.

The first channel information obtaining unit 52 is configured to obtain, in the (k+1)-th TTI, the channel information of a first part of UEs among the UEs in the connected state.

The second channel information obtaining unit 53 is configured to obtain, in the k-th TTI, the channel information of a second part of UEs.

Optionally, the first channel information obtaining unit 52 and the second channel information obtaining unit 53 described above may be implemented as one channel information obtaining unit which is configured to obtain the channel information of a part of the UEs in different TTIs.

The UE determining unit 54 is configured to determine in the k-th TTI, based on the channel information of the second part of UEs and the geographic position information of the second part of UEs, that the channel information of the first part of UEs is to be obtained in the (k+1)-th TTI, where k is a positive integer.

The pairing scheduling unit 55 is configured to select a UE to be scheduled from the first part of UEs based on the channel information of the first part of UEs. For example, when the embodiment of the disclosure is applied to the MU-MIMO system, the UE on which MU-MIMO paring scheduling is to be performed is selected.

The scheduling apparatus 50 according to this embodiment obtains the channel information of a part of the UEs, but not the channel information of all the UEs, in each TTI, and the UE to be scheduled is selected based on the obtained channel information of the part of the UEs. The overall amount of fed-back channel information is decreased, the frequency for obtaining the channel information of the same UE is lowered, the complexity of the pairing scheduling mechanism is reduced, the scheduling delay is shortened, and the validity of the channel information and the accuracy of the actual throughput are improved.

Optionally, in an implementation of this embodiment, if k=1, the second channel information obtaining unit is configured to obtain, in the k-th TTI, the channel information of a second part of UEs among the UEs in the connected state by: obtaining the channel information of each of the UEs in the connected state, or obtaining the channel information of a part of the UEs in the connected state randomly, which is not limited herein.

Figure 6A:
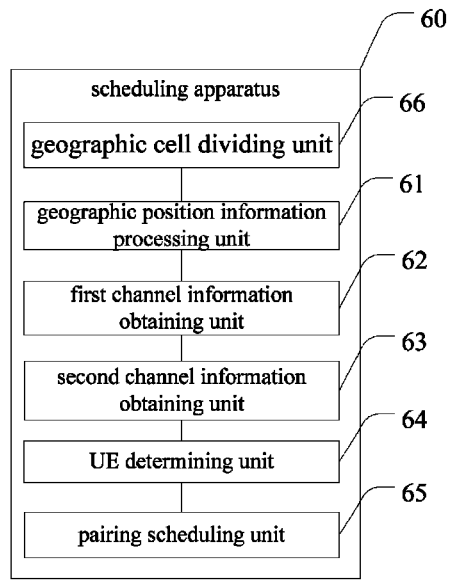
FIG. 6A is a schematic structural diagram of an apparatus for scheduling user equipments in a communication system according to an embodiment of the disclosure.

Referring to FIG. 6A, in which an apparatus for scheduling user equipments in a communication system according to an embodiment of the disclosure is shown, the scheduling apparatus 60 includes, in addition to a geographic position information processing unit 61, a first channel information obtaining unit 62, a second channel information obtaining unit 63, a UE determining unit 64 and a pairing scheduling unit 65 (for the first channel information obtaining unit 62 and second channel information obtaining unit 63, reference may be made to the corresponding description in the embodiment shown in FIG. 5, which is not repeated herein), a geographic cell dividing unit 66.

The geographic cell dividing unit 66 is configured to: set geographic cells to which respective base stations belong; divide each geographic cell into a plurality of geographic user clusters, and determine a corresponding base station for each geographic user cluster based on a position where the geographic user cluster locates in the geographic cell, wherein each geographic user cluster represents a fixed geographic region in the geographic cell; and determine a plurality of geographic user sets based on the plurality of geographic user clusters, wherein the geographic user set is a set including any number of geographic clusters among the plurality of geographic user clusters.

As an example, for the description of geographic cell, the geographic user set and the geographic user cluster, reference may be made to the corresponding description in the embodiment shown in FIG. 2B.

Figure 6B:
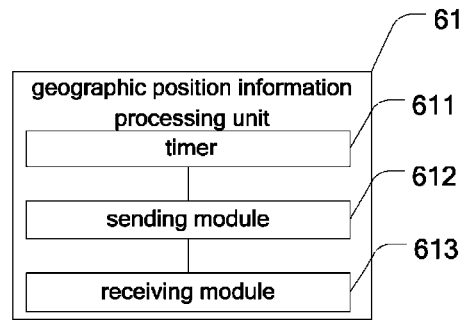
FIG. 6B is a schematic structural diagram of a geographic position information processing unit of the scheduling apparatus shown in FIG. 6A.

Optionally, in an implementation for this embodiment, referring to FIG. 6B, the geographic position information processing unit 61 includes timers 611 corresponding to the UEs, a sending module 612 and a receiving module 613.

The timer 611 is set to be in a first state at every interval, to indicate that the geographic position information obtaining unit 61 needs to obtain the geographic position information of the UE corresponding to the timer, the timer 611 is set to be in a second state after the geographic position information of the UE corresponding to the timer is obtained by the geographic position information obtaining unit 61, to indicate that the geographic position information obtaining unit 61 needs not to obtain the geographic position information of the UE corresponding to the timer 611, and the interval is longer than one TTI (such as tens of TTIs). The value of the interval may be fixed, or may be agreed between the base station and the UE suing the high level signaling or the physical layer signaling.

For the switching of the timer 611 between the first state and the second state, reference may be made to the corresponding description in the embodiment shown in FIG. 1.

The sending module 612 is configured to notify (for example, using the RRC signaling), in the current TTI, the UEs corresponding to the timers in the first state to feed back the geographic position information.

The receiving module 613 is configured to receive the geographic position information fed back by the UEs corresponding to the timers in the first state, wherein the geographic position information includes a geographic user cluster index or an invalid identifier, the geographic user cluster index is used to indicate the geographic user cluster to which the UE belongs, facilitating the serving base station to determine the geographic user cluster and the geographic user set to which the UE belongs based on the geographic user cluster index, and the invalid identifier is used to indicate that the corresponding UE is the geographic cell to which the serving base station belongs. Further, optionally, the geographic position information processing unit 61 may further include a storage for storing the geographic position information of the UEs. The geographic position information of the UEs in a certain period of time is stored in the storage, so that the variation in the position of the UEs may be determined based on the geographic position information of the UEs.

Figure 6C:
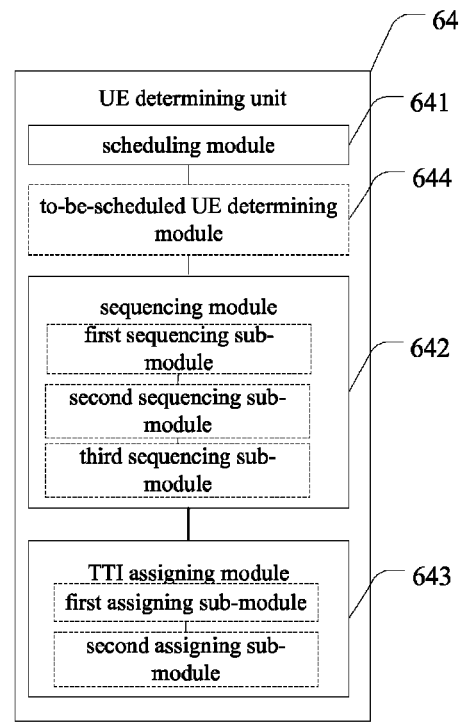
FIG. 6C is a schematic structural diagram of a UE determining unit of the scheduling apparatus shown in FIG. 6A.

Optionally, in an implementation for this embodiment, referring to FIG. 6C, the UE determining unit 64 includes a scheduling module 641, a sequencing module 642 and a TTI assigning module 643 (the dashed line indicates that the module/sub-module is optional).

The scheduling module 641 is configured to select, in the k-th TTI, the UE to be scheduled from the second part of UEs based on the channel information of the second part of UEs.

The sequencing module 642 is configured to sequence a first queue based on the geographic position information of the second part of UEs and the UE scheduled in the k-th TTI, wherein the first queue is a queue of all the geographic user sets in the geographic cell in which the serving base station is located arranged in a descending order of value of PF factor.

The TTI assigning module 643 is configured to assign, for each of the UEs in each of the geographic user sets, the TTI for obtaining the channel information of the UE, so as to determine that the channel information of the first part of UEs is to be obtained in the (k+1)-th TTI.

In the implementation shown in FIG. 6C, optionally, in addition to the scheduling module 641, the sequencing module 642 and the TTI assigning module 643, the UE determining unit 64 further includes a to-be-scheduled UE determining module 644.

The to-be-scheduled UE determining module 644 is configured to select the UE to be scheduled from each of the geographic user clusters corresponding to the serving base station in a manner of round-robin scheduling or random scheduling, to facilitate the apparatus to calculate in the (k+1)-th TTI the maximum instantaneous throughput of all geographic user sets in the (k+1)-th TTI based on the UE to be scheduled, and the PF factors are calculated to determine the queue in which all the geographic user sets are arranged in the descending order of the value of the PF factor, where the PF factor is calculated by dividing the maximum instantaneous throughput of the geographic user set in the (k+1)-th TTI by an alpha filtered historical throughput within a sliding window.

In the implementation shown in FIG. 6C, further, optionally, the sequencing module 642 includes a first sequencing sub-module, a second sequencing sub-module and a third sequencing sub-module.

The first sequencing sub-module is configured to arrange, at a tail of the first queue, the geographic user set that does not meet a first condition among the geographic user sets to which the second part of UEs belong based on the geographic position information of the second part of UEs, wherein the first condition is that at least one UE of the second part of UEs is contained and the UE belongs to the same geographic user cluster for a preset period of time. The second sequencing sub-module is configured to arrange the geographic user set, that is arranged at a head of the first queue currently, at the tail of the first queue. The third sequencing sub-module is configured to arrange the UE to be scheduled, which is selected from the second part of UEs, at the end of the geographic user cluster to which the UE belongs.

The TTI assigning module 643 includes a first assigning sub-module and a second assigning sub-module.

The first assigning sub-module is configured to assign, for the UEs in the geographic user sets in the sequenced first queue, the TTIs for obtaining the channel information of the UEs in a way that the TTIs assigned for UEs in an anterior geographic user set are earlier than the TTIs assigned for the UEs in a posterior geographic user set.

The second assigning sub-module is configured to assign earlier TTIs for anterior UEs and latter TTIs for posterior UEs.

As to be understood by those skilled in the art, the sequencing module 642 and the TTI assigning module 643 may perform the sequencing operation in any TTI using the same method.

In the scheduling apparatus according to the embodiment shown in FIG. 6A and the implementations, by means of the slow feedback for the geographic position information (for each UE, the feedback interval for feeding back the geographic position information is about in the order of second) and the fast feedback for the channel information of the part of the UEs, the overall amount of the fed-back information is decreased; since the channel information of a part of the UEs is obtained (for example, the channel information of the first columns of UEs in the geographic user clusters in the corresponding geographic user sets is obtained in the assigned TTI), and then the UE is scheduled (such as for MU-MIMO paring scheduling), as compared with the apparatus in which the channel information of all the UEs is obtained for user scheduling, the complexity is reduced, the delay between the time instant when the channel information of the UEs is obtained and the time instant for user scheduling is shortened, and the actual higher throughput and efficiency are ensured.

Figure 7:
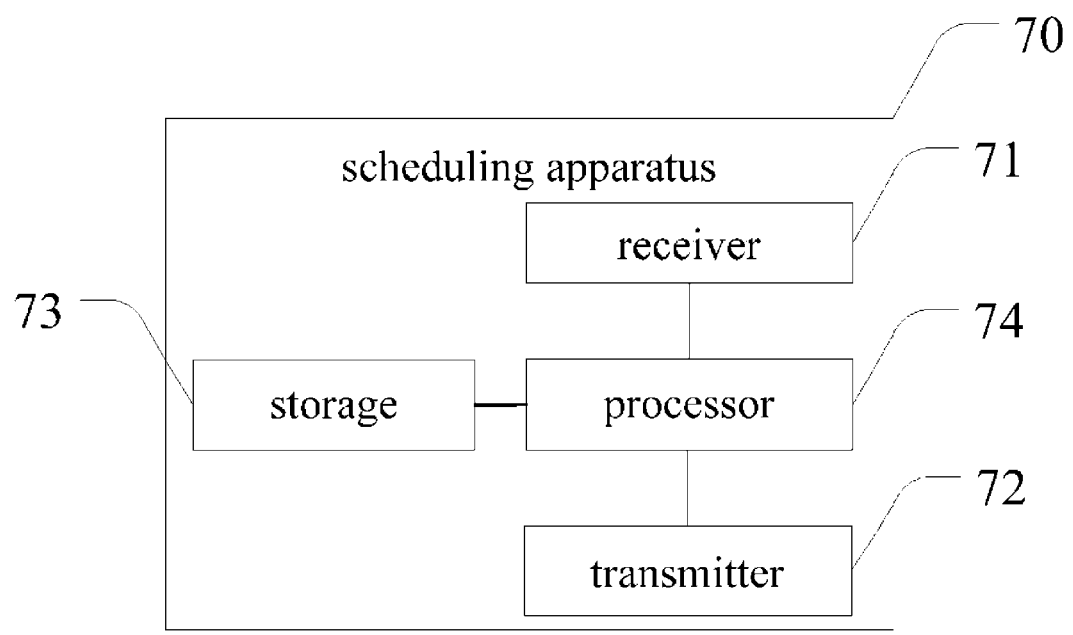
FIG. 7 is a schematic structural diagram of an apparatus for scheduling user equipments in a communication system according to an embodiment of the disclosure.

Referring to FIG. 7, in which an apparatus for scheduling user equipments in a communication system according to an embodiment of the disclosure is shown, the scheduling apparatus 70 includes:

a receiver 71, a transmitter 72, a storage 73 and a processor 74 connected to the receiver 71, the transmitter 72 and the storage 73, and various programs and applications are stored in the storage 73 for calling by the processor 74 to perform processes as follows.

The geographic position information of the UE in connected state is obtained via the receiver 71 and the UEs which need to feed back the geographic position information for geographic position update are determined in each transmission, TTI.

The channel information of a first part of UEs among the UEs in the connected state is obtained via the receiver 71 in the (k+1)-th TTI, wherein it is determined by the processor 74 in the k-th TTI, based on the channel information of a second part of UEs obtained in the k-th TTI and the geographic position information of the second part of UEs, that the channel information of the first part of UEs is to be obtained in the (k+1)-th TTI, where k is a positive integer.

The UE to be scheduled (such as MU-MIMO matched and scheduled) is selected from the first part of UEs based on the channel information of the first part of UEs. For example, in the MU-MIMO system, the UE on which MI-MIMO scheduling is to be performed may be selected.

Optionally, in an implementation for this embodiment, the geographic position information of the UE in the connected state is stored in the storage 73.

Optionally, in an implementation for this embodiment, the information on division of the geographic cells is stored in the storage 73. The geographic cell corresponds to the base station. Each geographic cell is divided into multiple geographic user clusters. The correspondence between the base station and the geographic user cluster is determined based on a position where the geographic user cluster locates in the geographic cell. Each geographic user cluster represents a fixed geographic region in the geographic cell. The geographic user set is composed of any number of geographic user cluster among the multiple geographic user cluster.

Optionally, in an implementation for this embodiment, the processor 74 includes timers corresponding to the UEs, the timers are set by the processor 74 to be in a first state at every interval, so that the processor 74 obtains the geographic position information of the UEs corresponding to the timers in the first state via the receiver 71, and the interval is longer than one TTI.

The processor 74 performs the process of determining, in each TTI, the UEs which need to feed back the geographic position information for geographic position update by:

sending the RRC signaling to the UEs via the transmitter 72, to notify the UEs corresponding to the timers in the first state to feed back the geographic position information;

receiving, via the receiver 71, the geographic position information fed back by the UEs corresponding to the timers in the first state, where the geographic position information includes a geographic user cluster index or an invalid identifier, the geographic user cluster index is used to indicate the geographic user cluster to which the UE belongs, so that the processor 74 determines the geographic user cluster and the geographic user set to which the UE belongs based on the geographic user cluster index, and the invalid identifier is used to indicate that the corresponding UE is the geographic cell to which the serving base station belongs; and setting the timers corresponding to the UEs that fed back the geographic position information to be in a second state, where the processor 74 needs not to obtain the geographic position information of the UEs corresponding the timers in the second state.

Optionally, in an implementation for this embodiment, the processor 74 performs the process of determining that the channel information of the first part of UEs is to be obtained in the (k+1)-th TTI by:

obtaining, via the receiver 71 in the k-th TTI, the channel information of the second part of UEs (optionally, if k=1, the second part of UEs include all the UEs in the connected state) to select the UE to be scheduled from the second part of UEs;

sequencing a first queue based on the geographic position information of the second part of UEs and the UE scheduled in the k-th TTI, where the first queue is a queue of all the geographic user sets in the geographic cell in which the serving base station is located arranged in a descending order of value of PF factor; and assigning, for each of the UEs in each of the geographic user sets, the TTI for obtaining the channel information of the UE, so as to determine that the channel information of the first part of UEs is to be obtained in the (k+1)-th TTI.

Further, optionally, the processor 74 is further configured to:

select the UE to be scheduled from each of the geographic user clusters corresponding to the serving base station in a manner of round-robin scheduling or random scheduling, so that the maximum instantaneous throughput of all the geographic user sets in the (k+1)-th TTI is calculated in the (k+1)-th TTI based on the UE to be scheduled, and the PF factors are calculated to determine the queue in which all the geographic user sets are arranged in the descending order of the value of the PF factor, where the PF factor is calculated by dividing the maximum instantaneous throughput of the geographic user set in the (k+1)-th TTI by an alpha filtered historical throughput within a sliding window.

Further, optionally, the processor 74 performs the process of sequencing the first queue by:

arranging, at a tail of the first queue, the geographic user set that does not meet a first condition among the geographic user sets to which the second part of UEs belongs based on the geographic position information of the second part of UEs, wherein the first condition is that at least one UE of the second part of UEs is contained and the UE belongs to the same geographic user cluster for a preset interval; arranging, at the tail of the first queue, the geographic user set that is located at a head of the first queue currently; and arranging the UE to be scheduled, which is selected from the second part of UEs, at the end of the geographic user cluster to which the UE belongs.

Further, optionally, the processor 74 performs the process of assigning, for each of the UEs in each of the geographic user sets, the TTI for obtaining the channel information of the UE by:

in the sequenced first queue, the TTIs assigned for UEs in an anterior geographic user set being earlier than the TTIs assigned for the UEs in a posterior geographic user set; and in each geographic user cluster, the TTIs assigned for anterior UEs being earlier than the TTIs assigned for posterior UEs.

For example, the technical effects of the method and the apparatus provided in the embodiment of the disclosure are as follows.

It is assumed that there are 37 geographic user clusters in one geographic cell, and there are 30 UEs in the connected state in each user cluster (37×30=1110 UEs in total). In the conventional art, the MU-MIMO is more sensitive to the moving speed of the UE when there are plenty of UEs, and the MU-MIMO is not applicable when the UE moves quick. Assuming that the uplink channel feedback is performed every 10 ms for reporting whether the UE is in the relatively static state, then the uplink channel feedback is performed 10 m/10 ms*1110=1110000 times in 10 m. With such a large amount of feedback, the base station suffers from immense pressure.

With this solution, it is assumed that the feedback period in which the UE feeds back the geographic position information (such as the index of the geographic user cluster to which the UE belongs) is 5 s (which is sufficient for reporting whether the UE is in the relatively static state). Since each user needs to perform the channel feedback only when the user is sequenced in the head of the UE queue of the geographic user cluster to which the user belongs, the amount of the channel feedback is about 1/30 (an estimated value) of that in the conventional art. Practically, the geographic user information feedback is added as compared with the conventional art, but this feedback is a slow feedback in the order of second or less and only the index of the geographic user cluster to which the UE belongs is fed back every time, the amount of the feedback is less. In total, in this solution, the amount of the uplink feedback is decreased, the complexity is reduced, and the validity of the channel information and the accuracy of the actual throughput are improved.

As to be understood by those skilled in the art, all or some of the processes of the method embodiment described above can be implemented by instructing related hardware using a computer program. The program may be stored in a computer readable storage medium. The program, when executed, may include the processes of the method embodiment described above. The storage medium may be a magnetic disk, an optical disk, a read-only memory (ROM) or a random access memory (RAM) or the like.

All those disclosed above are only preferred embodiments of the present disclosure and can certainly not be used to define the scope of protection of the claims of the present disclosure. Accordingly, the equivalent alternation made based on the present invention falls within the scope of protection of the present invention.

The invention claimed is:

1. A method for scheduling user equipments in a communication system, comprising:

obtaining geographic position information of the user equipments UEs in connected state, and determining, in each transmission time interval, TTI, the UEs which need to feed back the geographic position information for geographic position update, by a serving base station;

obtaining, in a k-th TTI, channel information of a second part of UEs among the UEs in the connected state;

determining, in the k-th TTI, a first part of UEs among the UEs in the connected state, based on the channel information of the second part of UEs and the geographic position information of the second part of UEs;

obtaining, in a (k+1)-th TTI, channel information of the first part of UEs, k being a positive integer; and selecting a UE to be scheduled from the first part of UEs based on the channel information of the first part of UEs.

2. The method according to claim 1, wherein before obtaining geographic position information of the UEs in connected state by the serving base station, the method further comprises:

setting geographic cells to which respective base stations belong;

dividing each geographic cell into a plurality of geographic user clusters, and determining a corresponding base station for each geographic user cluster based on a position where the geographic user cluster locates in the geographic cell, wherein each geographic user cluster represents a fixed geographic region in the geographic cell; and determining a plurality of geographic user sets based on the plurality of geographic user clusters, wherein the geographic user set is a set comprising any number of geographic clusters among the plurality of geographic user clusters.

3. The method according to claim 2, wherein the serving base station is provided with timers corresponding to the UEs, the timers are set to be in a first state at every interval, so that the serving base station obtains the geographic position information of the UEs corresponding to the timers in the first state, and the interval is longer than one TTI; and determining, in each TTI, the UEs which need to feed back the geographic position information for geographic position update comprises:

in the k-th TTI and the (k+1)-th TTI, notifying, by the serving base station, the UEs corresponding to the timers in the first state to feed back the geographic position information;

receiving the geographic position information fed back by the UEs corresponding to the timers in the first state, wherein the geographic position information comprises a geographic user cluster index or an invalid identifier, the geographic user cluster index is used to indicate the geographic user cluster to which the UE belongs, facilitating the serving base station to determine the geographic user cluster and the geographic user set to which the corresponding UE belongs based on the geographic user cluster index, and the invalid identifier is used to indicate that the corresponding UE is the geographic cell to which the serving base station belongs; and setting the timers corresponding to the UEs that fed back the geographic position information to be in a second state, wherein the serving base station needs not to obtain the geographic position information of the UEs corresponding the timers in the second state.

4. The method according to claim 2, wherein determining in the k-th TTI the first part of UEs comprises:

selecting, in the k-th TTI, the UE to be scheduled from the second part of UEs based on the channel information of the second part of UEs;

sequencing a first queue based on the geographic position information of the second part of UEs and the UE scheduled in the k-th TTI, wherein the first queue is a queue of all the geographic user sets in the geographic cell in which the serving base station is located arranged in a descending order of value of PF factor; and assigning, for each of the UEs in each of the geographic user sets, the TTI for obtaining the channel information of the UE, so as to determine that the channel information of the first part of UEs is to be obtained in the (k+1)-th TTI.

5. The method according to claim 4, wherein after sequencing the first queue and before determining that the channel information of the first part of UEs is to be obtained, the method further comprises:

selecting the UE to be scheduled from each of the geographic user clusters corresponding to the serving base station in a manner of round-robin scheduling or random scheduling, so that the maximum instantaneous throughput of all geographic user sets in the (k+1)-th TTI is calculated in the (k+1)-th TTI based on the UE to be scheduled, and the PF factors are calculated to determine the sequence in which all the geographic user sets are arranged in the descending order of the value of the PF factor, wherein the PF factor is calculated by dividing the maximum instantaneous throughput of the geographic user set in the (k+1)-th TTI by an alpha filtered historical throughput within a sliding window.

6. The method according to claim 5, wherein sequencing the first queue comprises:

arranging, at a tail of the first queue, the geographic user set that does not meet a first condition among the geographic user sets to which the second part of UEs belong based on the geographic position information of the second part of UEs, wherein the first condition is that at least one UE of the second part of UEs is contained and the UE belongs to the same geographic user cluster for a preset period of time;

arranging the geographic user set, that is arranged at a head of the first queue currently, at the tail of the first queue; and arranging the UE to be scheduled, which is selected from the second part of UEs, at the end of the geographic user cluster to which the UE belongs.

7. The method according to claim 6, wherein assigning, for each of the UEs in each of the geographic user sets, the TTI for obtaining the channel information of the UE comprises:

in the sequenced first queue, the TTIs assigned for UEs in an anterior geographic user set being earlier than the TTIs assigned for the UEs in a posterior geographic user set; and in each geographic user cluster, the TTIs assigned for anterior UEs being earlier than the TTIs assigned for posterior UEs.

8. The method according to claim 4, wherein in case of k=1, obtaining the channel information of the second part of UEs comprises obtaining the channel information of each of the UEs in the connected state.

9. An apparatus for scheduling user equipments in a communication system, comprising:

one or more processors; and a memory, storing program instructions, that when executed by the one or more processors, configured the apparatus to:

obtain geographic position information of the user equipments, UEs, in connected state contained in a serving base station, and determine, in each transmission time interval, TTI, the UEs which need to feed back the geographic position information for geographic position update;

obtain, in a k-th TTI, channel information of a second part of UEs among the UEs in the connected state;

determine in the k-th TTI, a first part of UEs among the UEs in the connected state, based on the channel information of the second part of UEs and the geographic position information of the second part of UEs, wherein k is a positive integer;

obtain, in a (k+1)-th TTI, channel information of the first part of UEs; and select a UE to be scheduled from the first part of UEs based on the channel information of the first part of UEs.

10. The apparatus according to claim 9, wherein when the instructions are executed by the one or more processors, the apparatus is further configured to:

set geographic cells to which respective base stations belong;

divide each geographic cell into a plurality of geographic user clusters, and determine a corresponding base station for each geographic user cluster based on a position where the geographic user cluster locates in the geographic cell, wherein each geographic user cluster represents a fixed geographic region in the geographic cell; and determine a plurality of geographic user sets based on the plurality of geographic user clusters, wherein the geographic user set is a set comprising any number of geographic clusters among the plurality of geographic user clusters.

11. The apparatus according to claim 10, further comprising:

timers corresponding to the UEs, wherein the timers are set to be in a first state at every interval, to indicate that the apparatus needs to obtain the geographic position information of the UEs corresponding to the timers, the timers are set to be in a second state after the geographic position information of the UEs corresponding to the timers is obtained, to indicate that the apparatus needs not to obtain the geographic position information of the UEs corresponding to the timers, and the interval is longer than one TTI;

wherein determining, in each TTI, the UEs which need to feed back the geographic position information for geographic position update comprises:

notifying, in the current TTI, the UEs corresponding to the timers in the first state to feed back the geographic position information; and receiving the geographic position information fed back by the UEs corresponding to the timers in the first state, wherein the geographic position information comprises a geographic user cluster index or an invalid identifier, the geographic user cluster index is used to indicate the geographic user cluster to which the UE belongs, facilitating the serving base station to determine the geographic user cluster and the geographic user set to which the corresponding UE belongs based on the geographic user cluster index, and the invalid identifier is used to indicate that the corresponding UE is the geographic cell to which the serving base station belongs.

12. The apparatus according to claim 10, wherein determining in the k-th TTI the first part of UEs comprises:

selecting, in the k-th TTI, the UE to be scheduled from the second part of UEs based on the channel information of the second part of UEs;

sequencing a first queue based on the geographic position information of the second part of UEs and the UE scheduled in the k-th TTI, wherein the first queue is a queue of all the geographic user sets in the geographic cell in which the serving base station is located arranged in a descending order of value of PF factor; and assigning, for each of the UEs in each of the geographic user sets, the TTI for obtaining the channel information of the UE, so as to determine that the channel information of the first part of UEs is to be obtained in the (k+1)-th TTI.

13. The apparatus according to claim 12, wherein when the instructions are executed by the one or more processors, the apparatus is further configured to:

select the UE to be scheduled from each of the geographic user clusters corresponding to the serving base station in a manner of round-robin scheduling or random scheduling, to facilitate the apparatus to calculate in the (k+1)-th TTI the maximum instantaneous throughput of all geographic user sets in the (k+1)-th TTI based on the UE to be scheduled, and the PF factors are calculated to determine the queue in which all the geographic user sets are arranged in the descending order of the value of the PF factor, wherein the PF factor is calculated by dividing the maximum instantaneous throughput of the geographic user set in the (k+1)-th TTI by an alpha filtered historical throughput within a sliding window.

14. The apparatus according to claim 13, wherein sequencing the first queue comprises:

arranging, at a tail of the first queue, the geographic user set that does not meet a first condition among the geographic user sets to which the second part of UEs belong based on the geographic position information of the second part of UEs, wherein the first condition is that at least one UE of the second part of UEs is contained and the UE belongs to the same geographic user cluster for a preset period of time;

arranging the geographic user set, that is arranged at a head of the first queue currently, at the tail of the first queue; and arranging the UE to be scheduled, which is selected from the second part of UEs, at the end of the geographic user cluster to which the UE belongs.

15. The apparatus according to claim 14, wherein assigning, for each of the UEs in each of the geographic user sets, the TTI for obtaining the channel information of the UE comprises:

assigning, for the UEs in the geographic user sets in the sequenced first queue, the TTIs for obtaining the channel information of the UEs in a way that the TTIs assigned for UEs in an anterior geographic user set are earlier than the TTIs assigned for the UEs in a posterior geographic user set; and assigning earlier TTIs for anterior UEs and latter TTIs for posterior UEs.

16. The apparatus according to claim 9, wherein in case of k=1, obtaining, in the k-th TTI, the channel information of the second part of UEs among the UEs in the connected state comprises:

obtaining the channel information of each of the UEs in the connected state.

\* \* \* \* \*